US012742346B2

(12) United States Patent
Koedderitzsch

(10) Patent No.: US 12,742,346 B2
(45) Date of Patent: Sep. 22, 2026

(54) VEHICLE DOOR FOR A MOTOR VEHICLE, IN PARTICULAR FOR A PASSENGER CAR, AND MOTOR VEHICLE

(71) Applicant: Bayerische Motoren Werke Aktiengesellschaft, Munich (DE)

(72) Inventor: Markus Koedderitzsch, Woerthsee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/103,961

(22) PCT Filed: Oct. 13, 2023

(86) PCT No.: PCT/EP2023/078468
§ 371 (c)(1),
(2) Date: Feb. 14, 2025

(87) PCT Pub. No.: WO2024/083668
PCT Pub. Date: Apr. 25, 2024

(65) Prior Publication Data
US 2026/0078613 A1 Mar. 19, 2026

(30) Foreign Application Priority Data
Oct. 19, 2022 (DE) ..................... 10 2022 127 593.0

(51) Int. Cl.
*E05B 79/06* (2014.01)
*E05B 81/76* (2014.01)
*E05B 85/10* (2014.01)

(52) U.S. Cl.
CPC .............. *E05B 79/06* (2013.01); *E05B 81/76* (2013.01); *E05B 85/10* (2013.01)

(58) Field of Classification Search
None
See application file for complete search history.

(56) References Cited

U.S. PATENT DOCUMENTS 9,279,272 B2 * 3/2016 Noda ........................ E05B 7/00
12,241,291 B2 * 3/2025 Mensch .................. E05B 81/54
(Continued)

FOREIGN PATENT DOCUMENTS

CN 112204217 A 1/2021
CN 113090141 A 7/2021
(Continued)

OTHER PUBLICATIONS

Machine translation of FR-2802961-A1 (Jun. 2001).*
(Continued)

*Primary Examiner* — Marcus Menezes
(74) *Attorney, Agent, or Firm* — Crowell & Moring LLP

(57) ABSTRACT

A vehicle door for a motor vehicle includes a handle element on an outside of the door, movable relative to a base body from a rest position into at least one actuating position. Moving the handle element from the rest position into the actuating position unlocks a lock securing the vehicle door in a closed position. A first guide is provided on the base body and a second guide is provided on the handle element. The guides interact to define a path of movement for the handle element. One of the guides has a guide link into which the other guide engages. At least one circuit board, on which at least one electronic component is arranged, is arranged at least partially in the guide link.

9 Claims, 3 Drawing Sheets

(56) References Cited

U.S. PATENT DOCUMENTS

| | | | | |
|---|---|---|---|---|
| 2001/0005082 | A1* | 6/2001 | Suparschi | E05B 85/18 292/347 |
| 2018/0375514 | A1 | 12/2018 | Liggenstorfer-Heimlicher et al. | |
| 2019/0337465 | A1 | 11/2019 | Schmid | |
| 2021/0339688 | A1* | 11/2021 | Beck | B60R 16/027 |

FOREIGN PATENT DOCUMENTS

| | | | | |
|---|---|---|---|---|
| DE | 10 2013 018 204 | A1 | 4/2015 | |
| DE | 10 2017 202 114 | A1 | 8/2018 | |
| DE | 10 2019 102 266 | A1 | 7/2020 | |
| FR | 2802961 | A1 * | 6/2001 | E05B 85/18 |
| WO | WO 2005/038176 | A1 | 4/2005 | |
| WO | WO 2006/007916 | A1 | 1/2006 | |
| WO | WO 2007/118552 | A1 | 10/2007 | |
| WO | WO 2008/120067 | A2 | 10/2008 | |
| WO | WO 2020/001137 | A1 | 1/2020 | |

OTHER PUBLICATIONS

International Search Report (PCT/ISA/210) issued in PCT Application No. PCT/EP2023/078468 dated Feb. 13, 2024 with English translation (5 pages).

German-language Written Opinion (PCT/ISA/237) issued in PCT Application No. PCT/EP2023/078468 dated Feb. 13, 2024 with English translation (10 pages).

German-language Search Report issued in German Application No. 10 2022 127 593.0 dated Aug. 23, 2023 with partial English translation (10 pages).

Chinese language Office Action issued in Chinese Application No. 202380055885.2 dated Aug. 3, 2026, with English translation (9 pages).

* cited by examiner

VEHICLE DOOR FOR A MOTOR VEHICLE, IN PARTICULAR FOR A PASSENGER CAR, AND MOTOR VEHICLE

BACKGROUND AND SUMMARY

The invention relates to a vehicle door for a motor vehicle, in particular for a passenger car. The invention also relates to a motor vehicle, in particular a passenger car, with at least one such vehicle door.

WO 2007/118552 A1 discloses a motor vehicle with a vehicle door which has a lower door part and an upper window part which are separated by a window sill. WO 2020/01137 A1 discloses a device for actuating a vehicle door of a vehicle, with a sensor device which is set up to detect a force acting on the vehicle door and to generate corresponding sensor data. Furthermore, DE 102017202 114 A1 discloses a motor vehicle with at least one side door having a door body. WO 2006/007916 A1 also discloses a power car door with an inner module and an outer module. Furthermore, DE 102010 101 164 A1 discloses a door handle unit for actuating a lock of a door or a flap.

The object of the present invention is to create a vehicle door for a motor vehicle, in particular for a passenger car, and a motor vehicle, so that a particularly advantageous operation can be realized in a particularly space-saving manner.

According to the invention, this object is achieved by a vehicle door and by a motor vehicle having the features of the independent claim(s). Advantageous embodiments of the invention are the subject of the dependent claims.

A first aspect of the invention relates to a vehicle door, also referred to simply as a door and designed, for example, as a side door, for a motor vehicle preferably designed as a passenger car and also referred to as a vehicle. This means that the motor vehicle, also referred to as a motor vehicle or vehicle, of which the interior, also referred to as the passenger cell or passenger compartment, is formed, for example, by a body of the motor vehicle designed in particular as a self-supporting body, comprises the body and the vehicle door in its fully manufactured state. The vehicle door has a handle element on the outside of the door. For example, the handle element, in particular in the installation position of the vehicle door, which assumes its installation position in the fully manufactured state of the motor vehicle, can be arranged above a beltline of the vehicle door in the vertical direction of the motor vehicle, or the handle element is arranged below the beltline in the vertical direction of the motor vehicle, in particular in the installation position of the vehicle door. The handle element is also referred to as an external handle or external door handle. In the fully manufactured state of the motor vehicle, the vehicle door is held on the body movably, in particular pivotably, so that the vehicle door can be arranged or is arranged, i.e., is to be held or is held on the body movably, in particular pivotably. In particular, the vehicle door is associated with a body opening of the body, the body opening of which is in particular a door opening. If the vehicle door is a side door, the door opening is a side door opening which, for example, is arranged on a left or right side of the body or the motor vehicle when viewed in the transverse direction of the motor vehicle. The vehicle door can be moved, in particular pivoted, relative to the body between a closed position and at least one open position. In the closed position, at least part of the body opening is closed by the vehicle door. In the open position, the vehicle door releases the partial region of the body opening so that, for example, in the open position of the vehicle door, a person can enter the interior or exit the interior via the released partial region of the body opening. In particular, it is provided that the handle element is arranged above or below the beltline in the installation position of the vehicle door and in relation to the closed position of the vehicle door in the vertical direction of the vehicle. The beltline is also simply referred to as a parapet or window sill or edge or flanged edge, or the beltline is formed by a flanged edge or coincides with the flanged edge. In particular, the beltline is or forms an edge, in particular a lower edge, by which, for example, a window opening, also known as a pane opening, for a window, in particular for a side window, of the vehicle door is at least partially delimited, in particular in the installation position of the vehicle door and in relation to the closed position of the vehicle door in the vertical direction of the motor vehicle.

For example, a person standing in the surroundings of the motor vehicle and thus of the vehicle door can grasp the handle element with their hand and, for example, at least partially grip it and, for example, subsequently exert a force on the handle element and thus on the vehicle door via the handle element in order to be able to handle the vehicle door, i.e., in particular to move it relative to the body, in particular to pivot it. For example, the person can exert such a force on the vehicle door via the handle element that the vehicle door is opened by the force, i.e., moved from the closed position to the open position relative to the body. Furthermore, the person in the surroundings can, for example, exert such a force on the handle element and thus on the vehicle door that the vehicle door is closed by the force, i.e., moved from the open position to the closed position. The feature that the handle element is arranged on the outer side of the door or on the outside, i.e., an outer-side handle element or a handle element on the outside of the door and thus an outside door handle, means that the handle element is arranged on an outer side of the vehicle door, the outside of which faces away from the interior and towards the surroundings when the vehicle door is in the installed position and at least in the closed position of the vehicle door. In order to be able to realize a particularly advantageous operation, in particular actuation, of the vehicle door, it is provided according to the invention that the handle element is held on the base body, in particular pivotably, relative to a base body of the vehicle door, also referred to as the door body, from a rest position into at least one actuation position, in particular between the rest position and the actuation position, wherein by moving the handle element from the rest position into the actuation position, a lock, also referred to as a door lock, is actuated, by means of which the vehicle door, which is movable, in particular pivotable, between the closed position and the at least one open position, can be arranged on the body of the motor vehicle or can be secured in the closed position, in particular relative to the body, can be unlocked, in particular mechanically unlocked and, in particular, can be unlocked purely mechanically and thus without the use of electrical energy or another form of energy. For example, in order to open the vehicle door, which is initially in the closed position and thus closed and secured by means of the lock in the closed position, in particular relative to the body, the person in the surroundings moves the handle element from the rest position to the actuation position, whereby the lock is unlocked, in particular mechanically and in particular purely mechanically.

By means of the lock, the vehicle door, which can be moved, in particular pivoted, between the closed position and the at least one open position, can be secured or arranged on the body of the vehicle (motor vehicle) in the closed position, in particular relative to the body, so that undesired movement of the vehicle door from the closed position to the open position is prevented. By unlocking the lock, the lock releases the vehicle door for movement from the closed position to the open position. In particular, the lock can be a component of the vehicle door so that the lock can be moved, in particular pivoted, in the vehicle door relative to the body between the closed position and the open position. The lock can, for example, be moved between a locked state and an unlocked state. By unlocking the lock, the lock is moved, i.e., transferred from the locked state to the unlocked state. For example, if the vehicle door is in the closed position and the lock is in the locked state, the vehicle door is secured by the lock in the closed position and thus against unwanted movement into the open position relative to the body. It can be seen that the vehicle door is a wing element which can be moved, in particular pivoted, on the body between the open position and the closed position. In particular, the vehicle door (wing element) is an add-on part that is separate from the body and can be held or held movably on the body between the open position and the closed position. For example, in order to open the vehicle door, which is initially closed and therefore initially in the closed position, and therefore to move it from the closed position to the open position, the handle element is moved, for example, by the person in the surroundings from the rest position to the actuated position, whereby the lock is unlocked and therefore transferred from the locked state to the unlocked state. As a result, the lock releases the vehicle door for a movement relative to the body from the closed position to the open position. For example, a locking element such as a locking bolt, also known as a lock bolt, or a lock bracket, also known as a locking bar, is attached to the body, in particular to a vehicle pillar of the body, which is designed as a door pillar, for example, and is also known as a body pillar or superstructure pillar. In the closed position of the vehicle door and in the locked state of the lock, the lock, in particular a fork latch of the lock, interacts with the locking element, in particular in a form-fitting manner, whereby the vehicle door can be secured or is secured in a form-fitting manner in the closed position. For example, the lock has a lock element, which can be the aforementioned fork latch, for example. In the closed position of the vehicle door and in the locked state of the lock, for example, the lock element interacts with the locking element, in particular in a form-fitting manner, whereby the vehicle door can be secured or is secured in the closed position, in particular in a form-fitting manner. For example, the lock element can be moved relative to a base element of the lock and in particular relative to the locking element between a locking position and an unlocking position, in particular translationally and/or rotationally. In the closed position of the vehicle door and in the locked position of the lock element, the lock element interacts, in particular form-fittingly, with the locking element, whereby the vehicle door can be secured or is secured in the closed position. By or during unlocking of the lock, for example, the lock element is moved from the locking element into the unlocking position, in which the lock element does not interact with the locking element. This releases the vehicle door for a movement relative to the body from the closed position to the open position.

In particular, it is provided that the lock can be mechanically unlocked, in particular purely and thus preferably without the use of electrical energy, by moving the handle element from the rest position to the actuating position. In other words, the lock can be unlocked, in particular mechanically and in particular purely mechanically and thus without the use of electrical energy, by moving the handle element relative to the base body from the rest position to the actuating position. It is contemplated that the rest position and the actuation position are respective end positions of the handle element, which can be moved relative to the base body into the respective end position, but cannot be moved beyond the respective end position.

Furthermore, it is provided according to the invention that the vehicle door has a first guide device provided on the base. This means in particular that the first guide device is a component of the base body or is held on the base body.

For example, the vehicle door has a body shell, also known as a door shell, wherein it is contemplated, in particular in the fully manufactured state of the motor vehicle, that the vehicle door can be held or held on the body of the motor vehicle in a movable, in particular pivotable, manner via the body shell. In other words, for example, the vehicle door is to be held or held on the body in a movable, in particular pivotable, manner via the body shell. For this purpose, it is provided, for example, that the vehicle door has at least one first hinge part, which is, for example, at least indirectly, in particular directly, attached, in particular fixed, to the body shell. The first hinge part is, for example, a component of a hinge, also known as a door hinge, which also has a second hinge part that is formed separately from the first hinge part. The second hinge part is attached or can be attached at least indirectly, in particular directly, to the body of the motor vehicle, in particular to the aforementioned vehicle pillar. The hinge parts are movably, in particular pivotably, connected or connectable to one another, so that the body shell can be arranged or positioned, i.e., held or retained, on the body via the hinge and via the body shell of the vehicle door as a whole in a movable, in particular pivotable, manner. For example, the body shell is at least partially made of a metallic material. In particular, it is contemplated that the body shell is part of the base body. It is also contemplated that the vehicle door, in particular the base body, has at least one outer cladding element, also known simply as a cladding element. For example, the outer cladding element is formed separately from the body shell and, in particular, is attached directly to the body shell. The outer cladding element is also referred to as a door panel or outer door panel. At least one region of the body shell is covered and thus clad by the outer cladding element, in particular in relation to the closed position of the vehicle door and in the installation position of the vehicle door to the surroundings and thus to the outside, i.e., in a direction pointing away from the interior of the motor vehicle. For example, the outer cladding element has an outer skin, also known as the outer cladding skin, which can be perceived visually and haptically by the person in the surroundings. For example, the handle element has an outer skin that can be perceived visually and haptically by the person in the surroundings of the vehicle door, in particular of the motor vehicle as a whole, which is also referred to as the outer skin of the handle element. In other words, the person in the surroundings can see the outer skin of the handle element with their eyes and thus perceive it visually, and the person in the surroundings can, for example, touch the outer skin of the handle element directly with their hand, in particular with their fingers, and thus perceive it haptically, in particular when the vehicle door and, in particular, the motor vehicle as a whole is fully assembled. The outer skin of the handle element is thus a surface of the handle element that can be perceived visually and haptically by the person in the surroundings or is formed by such a surface. And the previous and following explanations regarding the outer skin of the handle element can also be readily transferred to the outer skin of the cladding and vice versa. In particular, it is contemplated that the vehicle door as a whole has an outer skin that can be perceived visually and haptically by the person in the surroundings, also referred to as the overall outer skin, wherein the previous and following explanations relating to the handle element outer skin and to the cladding outer skin can also be readily transferred to the overall outer skin and vice versa. For example, the outer skin of the handle element is a first part of the overall outer skin, while the outer skin of the cladding is a second part of the overall outer skin. In particular, it is contemplated that at least a part of the outer cladding element and thus of the cladding outer skin adjoins the window opening and/or the beltline in the installation position of the vehicle door and, in particular, in the closed position of the vehicle door in the vertical direction of the vehicle.

For example, the first guide device can be a component of the body shell, or the first guide device is attached at least indirectly, in particular directly, to the body shell.

Furthermore, the vehicle door has a second guide device provided on the handle element. Thus, for example, the second guide device is part of the handle element, or the second guide device is held, in particular attached, to the handle element. The second guide device interacts with the first guide device, in particular in a form-fitting manner, whereby the handle element can be moved along a path of movement relative to the base body that is predetermined or defined by the interacting guide devices from the rest position into the actuating position, in particular between the rest position and the actuating position. One of the guide devices, in particular the first guide device, has a guide link, which is also referred to as a guide track, for example. The other guide device, in particular the second guide device, engages in the guide link, whereby the guide devices interact. The other guide device, in particular the second guide device, is or comprises, for example, at least one guide element which engages, for example, in the guide track. The guide devices interact, in particular in a form-fit manner, in particular by the guide devices engaging with one another. This can be realized in particular by the guide device engaging in the corresponding guide link. Due to the interaction of the guide devices, the handle element is guided along the path of movement relative to the base body, which is predetermined and therefore defined by the interacting guide devices, and can be moved from the rest position into the actuation position, in particular between the rest position and the actuation position. This means in particular that, for example, the second guide device, in particular the guide element, and with it the handle element can be moved along the first guide device, in particular along the guide link, and thus, for example, guided relative to the first guide device, in particular relative to the guide link, and relative to the base body, so that or whereby the handle element can be moved or is moved along the path of movement relative to the base body from the rest position into the actuation position, in particular between the rest position and the actuation position. In this way, a simple, convenient and ergonomic movement of the handle element can be realized, in particular from the rest position into the actuating position, so that a particularly simple, convenient and ergonomic actuation and thus operation of the vehicle door can be provided.

In order to realize a particularly compact and thus space-saving structure and thus to be able to realize the advantageous operation, in particular actuation, of the vehicle door in a particularly space-saving manner, it is further provided according to the invention that at least one circuit board, also referred to as a printed board, printed circuit board or printed circuit, on which at least one electronic component is arranged, is arranged at least partially in the guide link, and thus engages at least partially in the guide link. The background to this is, in particular, that modern exterior door handles are usually equipped with electronic components in order to be able to realize particularly advantageous functionalities, especially for the aforementioned person. The region of an exterior door handle is a space-critical region of the vehicle door, so that it is usually difficult to position the electronic components and accordingly to realize the functionalities. The invention now makes it possible to position, i.e., locate, the circuit board and the at least one electronic component in a particularly space-saving manner. For example, the circuit board and the at least one electronic component are or form an electronics unit, also simply referred to as electronics, which according to the invention is partially, in particular at least predominantly and thus at least more than half or completely, arranged in the guide link, i.e., engages in the guide link. As a result, a particularly space-saving structure can be achieved. This makes it possible, for example, to implement at least one of the aforementioned functionalities or the aforementioned functionalities in a space-saving manner, so that a particularly advantageous, convenient and ergonomic operation of the vehicle door can be achieved. According to the invention, the guide link, also referred to as a guide track, link guide or link track, thus has at least one dual function. On the one hand, the guide link is used to be able to realize a precise and defined movement of the handle element along the movement path, thus defining the movement path, which is in particular an imaginary movement path. On the other hand, the guide link is used to stow the electronics at least partially in the guide link. In order to be able to realize a particularly compact and thus space-saving structure, it is provided in one embodiment of the invention that the circuit board and the electronic component, i.e., the electronics, are held at least indirectly on the other guide device and can thus be moved along the guide link with the other guide device.

It has been shown to be particularly advantageous if the circuit board and the component, i.e., the electronics, are embedded in a potting compound, which is formed in particular from plastic and, for example, forms a solid body, in particular in such a way that the electronics unit is completely, i.e., fully, surrounded by the potting compound on the outer circumference. It is also contemplated that at least a partial region of the electronics is embedded in the potting compound, i.e., surrounded by the potting compound. The circuit board and the component, i.e., the electronics, are held on the other guide device via the potting compound, in particular in such a way that the potting compound is directly connected to the other guide device. This allows a simple and particularly compact design to be realized with only a small number of parts.

In order to be able to arrange the circuit board in a particularly space-saving manner, it is provided in a further embodiment of the invention that the circuit board has a plurality of circuit board regions which extend at an angle to one another and are formed in one piece with one another. For example, the respective circuit board region extends in itself, i.e., considered on its own in a respective circuit board region plane. In this respect, the feature that the circuit board regions extend at an angle to one another means in particular that the circuit board region planes, in particular in pairs, extend at an angle or perpendicular to one another, therein enabling a particularly space-saving design of the circuit board per se.

The feature that the circuit board regions are formed in one piece with each other means that the circuit board regions are formed from a single piece and are thus formed as a monoblock or are formed by a monoblock. In other words, the circuit board regions are formed from or by a one-piece body, thus manufactured in one piece and thus formed from a single piece, which is in particular the aforementioned monoblock. In other words, the board regions are not composed of several parts formed separately from one another and connected to one another, but the board regions are formed from a single piece and are thus integrally manufactured, and thus the aforementioned integral bodies.

In order to be able to realize a particularly compact design, it is provided in a further embodiment of the invention that the circuit board regions are arranged in respective longitudinal regions of the guide link which extend obliquely or perpendicularly to one another, whereby a shape of the circuit board is adapted to a shape of the guide link. Alternatively or additionally, it is contemplated that the circuit board regions are arranged in at least one arcuate longitudinal region of the guide link, whereby a shape of the circuit board is adapted to a shape of the guide link. This enables a particularly compact and therefore space-saving design.

In a further embodiment of the invention, it is contemplated that the circuit board is bent, whereby, for example, the circuit board is adapted to a shape of the guide link. In particular, it is contemplated that the circuit board is designed as a single piece, i.e., formed from a single piece. This can also keep the installation space requirement to a minimum.

A further embodiment is distinguished in that the circuit boards have several circuit board parts that run at an angle to one another, are designed separately from one another and are electrically connected to one another. For example, the circuit board parts are electrically connected to each other by means of at least one cable, which is designed in particular as an electrical cable. For example, the respective circuit board part itself, i.e., considered on its own, is designed as a single piece, i.e., formed from a single piece. The previous and following explanations regarding the circuit board regions can also be easily transferred to the circuit board parts and vice versa. It is therefore contemplated, for example, that the respective circuit board part runs in a respective circuit board part plane, i.e., extends in the respective circuit board part plane. In this respect, the feature that the circuit board parts run at an angle to each other means that the circuit board part planes, in particular in pairs, run at an angle or perpendicular to each other. This ensures a particularly small installation space requirement for the circuit board.

In order to be able to keep the installation space requirement particularly low, it is provided in a further embodiment of the invention that the circuit board parts are arranged in respective, oblique or perpendicular longitudinal regions of the guide link, whereby a shape of the plate is adapted to a shape of the guide link. Alternatively or additionally, the circuit board parts are arranged in at least one arcuate longitudinal region of the guide link, whereby the shape of the plate is adapted to the shape of the guide link. This ensures a particularly compact design.

It is preferable for the movement path to be arcuate and therefore curved. For this purpose, it is particularly provided that the guide track is arcuate and thus curved. This allows a particularly compact and therefore space-saving design to be created. In particular, the guide link is arcuate, whereby the arcuate path of movement is predetermined, i.e., defined. As a result, for example, the guide link or the one guide device can be designed to be particularly space-saving, so that, for example, the first guide device can be arranged particularly advantageously in a shaft, also known as a window shaft or window well. For example, in the installed position of the vehicle door and in the closed position of the vehicle door, the shaft adjoins the beltline (edge of the vehicle) in the vertical direction of the vehicle. For example, in the installation position of the vehicle door and in the closed position of the vehicle door in the transverse direction of the vehicle, the shaft is at least partially bounded outwards and thus towards the surroundings, in particular directly, by the outer cladding element. For example, in the installation position of the vehicle door in the vehicle vertical direction of the motor vehicle, the pane can be displaced relative to the body shell and relative to the outer cladding element and can be moved, in particular translationally, between at least one pane closed position and at least one pane open position relative to the body shell and relative to the outer cladding element. At least in the pane open position, at least one partial region of the pane, also referred to as the pane partial region, is arranged in the shaft, in particular in such a way that the pane partial region is arranged below the beltline in the installation position of the vehicle door and in the closed position of the vehicle door in the vertical direction of the vehicle. In the window closed position, the window portion is located outside the shaft and, in particular, in the installation position of the vehicle door and in the closed position of the vehicle door, above the beltline in the vertical direction of the vehicle. For example, the shaft ends at the top of the beltline in the installation position of the vehicle door in relation to the closed position in the vertical direction of the vehicle. In particular, it is contemplated that the guide link or the one guide device is arranged, especially completely, in the shaft. Due to the arcuate design of the guide link and thus the movement path, a particularly compact structure of the one guide device, in particular the first guide device, can be realized, so that the one guide device, in particular the first guide device, can be arranged particularly advantageously in the shaft.

In order to be able to realize a particularly advantageous operation of the vehicle door in a particularly space-saving manner, it is provided in a further embodiment of the invention that the component comprises a sensor and/or an antenna and/or a microchip and/or power electronics and/or an LED (light-emitting diode). In this way, a particularly advantageous functionality and thus a particularly advantageous operation of the vehicle door can be realized in a space-saving manner.

In order to be able to realize a particularly advantageous operation of the vehicle door in a particularly space-saving manner, it is provided in a further embodiment of the invention that a control element is integrated into the handle element, whereby the lock can be electrically unlocked. In particular, this means that the control element is held on the handle element or is a component of the handle element. In particular, it is contemplated that the control element is held on a base of the handle element, wherein it is contemplated that the control element is formed separately from the base. The control element can be held immovably or movably, in particular pivotably, on the base or on the handle element. The control element can be used to unlock the lock electrically. For example, in order to open the vehicle door, which is initially in the closed position and thus closed and secured by means of the lock in the closed position, in particular relative to the body, the person in the surroundings operates, in particular actuates, the control element, whereby the lock is electrically unlocked, i.e., whereby the lock an electrically unlocking of the lock is effected. In particular, the person touches the control element. By operating, in particular actuating, the control element, the lock is electrically unlocked, i.e., electrically transferred from the locked state to the unlocked state.

The control element can be, for example, a mechanical control element such as a knob, a sensing device or a button, so that the control element can be moved, for example, relative to the handle element and/or relative to the base between an initial position and an operating position, in particular translationally and/or rotationally. By operating, in particular actuating, the control element, for example, the control element is moved from the initial position relative to the handle element and/or relative to the base into the operating position, whereby the lock can be electrically unlocked, and consequently whereby the lock can be electrically unlocked. Furthermore, it is contemplated that the control element is designed as a touch-sensitive surface or comprises a touch-sensitive surface, wherein the control element is operated by touching the touch-sensitive surface, i.e., can be operated. It is contemplated that the touch-sensitive surface is a part of the outer skin of the handle element known as the detection part.

The feature that the lock can be electrically unlocked by operating, in particular actuating, the control element means in particular that an electrically operable actuator, in particular an electric motor, is controlled, in particular electrically, for example as a result of operating the control element. By controlling the actuator, the actuator is operated electrically so that, for example, the lock element is moved from the locked position to the unlocked position by means of the actuator, in particular using electrical energy and therefore electrically. This means that the lock element is moved electrically from the locked position to the unlocked position, whereby the lock is unlocked electrically, i.e., using the aforementioned electrical energy. A movement of the vehicle door from the closed position to the open position following the electrical unlocking of the lock can then, for example, be effected manually by the person in the surroundings, in particular by the person manually exerting a force, in particular a pulling force or a pushing force, on the handle element and thus moving the vehicle door relative to the body from the closed position to the open position. It is also contemplated that, as a result of operating the control element, the vehicle door is moved or can be moved electrically, i.e., using electrical energy, from the closed position to the open position relative to the body, in particular after the lock has been unlocked, in particular electrically. For this purpose, for example, an electrically operable movement device is provided, which for example has the aforementioned electrically operable actuator and/or at least one further electrically operable actuator. As a result of operating the control element, the movement device is activated, for example, in particular electrically, whereby the movement device moves, in particular pivots, the vehicle door from the closed position to the open position using electrical energy and thus electrically relative to the body. This means that the lock can be unlocked particularly conveniently and the vehicle door can be opened particularly conveniently, i.e., moved from the closed position to the open position.

In particular, the vehicle door is designed so that the lock can be electrically unlocked by operating, in particular actuating, the control element without the handle element moving from the rest position to the actuating position, i.e., while the handle element does not move from the rest position to the actuating position. This makes it possible to achieve a particularly advantageous, in particular a particularly convenient and at the same time safe, operation of the vehicle door. The handle element has at least a dual function: On the one hand, because the control element is integrated into the handle element, the handle element can be used to unlock the lock electrically and thus particularly conveniently and, for example, to subsequently be able to handle the vehicle door easily, ergonomically and thus advantageously via the handle element. On the other hand, the handle element can function, be designed or be used as an emergency unlocking control element, wherein the emergency unlocking control element is also referred to as an emergency unlocking or emergency unlocking element. This means in particular the following: For example, the control element is or comprises a detection sensor, which can be, for example, the aforementioned sensor arranged on the circuit board. In particular, the detection sensor can be operated electrically or electronically, for example, and is therefore an electrical or electronic sensor. In particular, the detection sensor can be arranged in the handle element or in the base. The detection sensor can be used, for example, to detect operation of the control element by a person in the surroundings. It is therefore contemplated that the detection sensor is part of the control element. If, for example, the detection sensor detects an operation of the control element by the person, i.e., in particular a movement of the control element from the initial position to the operating position caused by the person, the first actuator is activated, in particular as described above, so that the lock is electrically unlocked by means of the first actuator. The first actuator can, for example, be part of the vehicle door. It is also contemplated that the detection sensor is a component of the vehicle door (wing element), in particular in such a way that the detection sensor is integrated into the handle element. In particular, the detection sensor can be the control element or be a component of the control element. In principle, it is possible, for example as a result of an accident involving the motor vehicle, that the control element and/or the detection sensor and/or the first actuator and/or the electronics can no longer be supplied with electrical energy or electrical current, for example because a power supply to the control element and/or the first actuator and/or the detection sensor and/or the electronics is damaged, interrupted or destroyed. The lock may then no longer be able to be unlocked electrically, for example because the first actuator can no longer be operated and/or because an operation or actuation of the control element can no longer be detected by the detection sensor and/or because the control element itself can no longer detect its operation. However, since it is now provided that the handle element itself and thus in particular together with the control element can be moved relative to the base body from the rest position into the actuation position, whereby the lock can be unlocked mechanically, in particular purely mechanically, the handle element is or functions (also) as an emergency unlocking control element. On the one hand, this makes it possible for the lock to be mechanically unlocked, i.e., in particular emergency unlocked, especially if the power supply has failed. For this purpose, for example, the person in the surroundings moves the handle element and, in particular, the control element with the handle element from the rest position to the actuated position. In this way, a particularly high level of safety can be achieved, so that particularly advantageous and safe operation is possible. On the other hand, the use of an additional, separate emergency unlocking control element can be avoided, so that a particularly advantageous and safe operation of the vehicle door can be realized in a space-saving, weight-saving and cost-effective manner. In addition, a particularly advantageous visual impression of the vehicle door and the motor vehicle as a whole can be realized, since, for example, impairment of the visual impression of the motor vehicle by an additional, separate emergency unlocking control element can be avoided.

Thus, in a further embodiment of the invention, it is provided that the electronic component is designed to detect an operation of the control element caused by a person such as the person present in the surroundings and causing the electrical unlocking of the lock. For example, the detection sensor is the electronic component or the detection sensor is a component of the electronic component.

In order to be able to realize a particularly advantageous operation, in particular actuation, of the vehicle door, it is advantageously provided that the handle element has a first partial region forming a first part of the overall outer skin, also referred to as the first body part, which has a first direction of extension and thus extends along the first direction of extension. It is contemplated that the first partial region protrudes from the base body in or along the first direction of extension. The first direction of extension is also referred to as the first direction. In the installed position of the vehicle door and in the closed position of the vehicle door, for example, the first direction runs in the transverse direction of the vehicle, in particular outwards and thus towards the surroundings. It is therefore preferable that the first sub-region protrudes from the base body in the first direction. Furthermore, the handle element preferably has a second partial region, also referred to as the second body part, which forms a second part of the overall outer skin. The second partial region of the grip element adjoins the first part of the grip element, in particular an end of the first partial region of the grip element facing away from the base body, wherein the second partial region of the grip element projects from the first partial region of the grip element in a second direction of extension, which is also referred to as the second direction, extending at an angle or perpendicular to the first direction of extension (first direction). As a result, for example, the second partial region is spaced apart from the base body and arranged in at least partial overlap with the base body. In the installation position of the vehicle door and in relation to the closed position of the vehicle door, for example, the second direction (second direction of extension) extends upwards in the vertical direction of the vehicle or the second direction points upwards in the vertical direction of the vehicle. For example, in the installation position of the vehicle door and in relation to the closed position of the vehicle door, the second partial region of the handle element is overlapped inwards in the transverse direction of the vehicle and thus towards the interior by the base body and thus, for example, by a part of the outer skin of the cladding. As a result, for example, the person in the surroundings can grasp the handle element, in particular the second partial region of the handle element, with their hand in a particularly advantageous and ergonomic manner, in particular grasp behind it, in particular in such a way that, for example, the person can move at least one of their fingers or several fingers between the second partial region of the handle element and the base body. The person can then exert a force on the handle element in a particularly advantageous manner in order to be able to handle the vehicle door in a particularly advantageous manner, i.e., in particular to be able to pivot it relative to the body.

In order to be able to realize a haptically particularly advantageous and in particular ergonomic and comfortable operation, in particular actuation, of the vehicle door, it is provided in a further embodiment of the invention that by the second partial region projecting from the first partial region in the second direction of extension, the handle element, in particular as a whole and thus viewed as a whole, is L-shaped or V-shaped and thus has an L-shape or V-shape. The partial regions of the grip element form the L-shape or the V-shape, wherein the partial regions of the grip element are respective legs of the L-shape or the V-shape. In particular, it is provided that the handle element is connected to the base body via the first portion of the handle element.

It is contemplated that the handle element, in particular the partial regions, is arranged above or below the beltline in the vertical direction of the vehicle, in particular completely, at least in the rest position and preferably also in the actuated position. In particular, it is contemplated that the control element is arranged above or below the beltline at least in the rest position and preferably also in the actuating position of the handle element in the vertical direction of the vehicle, in particular completely.

For example, the base body has an outer skin, also referred to as the base body outer skin, wherein the previous and following explanations regarding the handle element outer skin, the overall outer skin and the cladding outer skin can also be readily transferred to the base body outer skin and vice versa. At least part of the base body outer skin is the cladding outer skin or is formed by the cladding outer skin. The base body outer skin is therefore part of the overall outer skin of the vehicle door. In particular, it is provided that the first partial region of the handle element protrudes in the first direction (first direction of extension) from the base body outer skin, in particular in the installation position of the vehicle door and/or in the closed position towards the surroundings and thus away from the interior. This can ensure a particularly advantageous, in particular a particularly ergonomic and convenient, actuation and thus operation of the vehicle door.

A second aspect of the invention relates to a motor vehicle preferably designed as a passenger car and also referred to as a motor vehicle or vehicle, which has at least one vehicle door according to the first aspect of the invention. Advantages and advantageous embodiments of the first aspect of the invention are to be regarded as advantages and advantageous embodiments of the second aspect of the invention and vice versa.

In order to be able to realize a particularly compact structure, in particular of the one guide device and in particular of the first guide device, it is provided in a further embodiment of the invention that in the installation position of the vehicle door and in the closed position of the vehicle door, the arcuate movement path or the arcuate guide link is curved towards the interior of the motor vehicle, i.e., convexly curved in the direction of the interior.

It has proven to be particularly advantageous if the rest position of the handle element is a first stable position of the handle element. This means that there is no relative movement between the handle element and the base body in the rest position. For example, a locking device is provided by means of which the handle element is held and can be held in the rest position in such a way that there is no relative movement between the base body and the handle element in the rest position. It has been shown to be particularly advantageous if the actuating position of the handle element is a second stable position of the handle element. Preferably, this means that the handle element can be moved from the rest position to the determined position, wherein relative movements between the handle element and the base body do not occur in the actuation position. In other words, a holding device is provided, for example, in the form of a latching device, which is, for example, the locking device or is a component of the locking device. By means of the holding device, the handle element is held or can be held relative to the base body in the actuating position, such that relative movements between the handle element and the base body do not occur in the actuating position of the handle element. In other words, once the handle element has been moved from the rest position to the actuation position, it remains in the actuation position in such a way that in the actuation position relative movements between the base body and the handle element are prevented, in particular by means of the holding device. As a result, undesired movement of the handle element from the actuation position back into the rest position relative to the base body can be avoided, so that a particularly safe and therefore advantageous operation of the vehicle door can be achieved.

In a particularly advantageous embodiment of the invention, the vehicle door has a retaining device which secures the handle element relative to the base body in the rest position, also referred to as the rest position, up to a limit force acting in particular on the handle element and passively, i.e., without the retaining device being actively actuated, allows the movement of the handle element relative to the base body from the rest position to the actuation position if an actuation force acting on the handle element and provided in particular for moving the handle element from the rest position to the actuation position and exerted on the handle element, for example by the person in the surroundings, exceeds the limit force. Thus, for example, the actuating force can be used to move the handle element from the rest position to the actuating position relative to the base body, and in particular only when the actuating force exceeds the limit force. However, the operation of the control element, i.e., the electrical unlocking of the lock by operating the control element, can be realized, for example, by means of a force exerted or to be exerted on the control element that is lower than the limit force. The following is therefore possible: The person in the surroundings can operate the control element and therein electrically unlock the lock in such a way that the person exerts a first force on the control element, for example. If the first force is less than the limit force or if the first force corresponds to the limit force, the lock is electrically unlocked, but the handle element is not moved from the rest position to the actuation position. Then and only then, for example, when the person exerts a second limiting force on the handle element, for example on the control element, which is greater than the first force and the limiting force, and thus, for example, on the handle element via the control element, is the handle element moved from the rest position into the actuation position relative to the base body. The limit force is dimensioned in such a way that during normal actuation or operation of the control element, the handle element does not move from the rest position to the actuation position, i.e., the control element can be easily and conveniently operated and the lock can therefore be easily and conveniently unlocked electrically without the handle element being accidentally or undesirably moved from the rest position to the actuation position. Put simply, the person must therefore exert a very high force on the handle element, which is greater than the limit force, in order to mechanically unlock the lock via the handle element, in particular mechanical emergency unlocking.

In order to be able to electrically unlock the lock simply, ergonomically and conveniently by operating the control element and to avoid mechanical unlocking of the lock, i.e., to avoid movement of the handle element from the rest position to the actuated position, it is provided in a further embodiment of the invention that the limit force is greater than 50 Newtons (N), in particular greater than 90 N. Very preferably, the limit force is greater than 95 N, in particular greater than 98 N. In particular, the vehicle door is preferably designed in such a way that the actuating force must be at least 100 newtons in order to move the handle element from the rest position to the actuating position. This means that in normal operation, i.e., when the vehicle has not been involved in an accident, the control element can be operated advantageously and thus the electric unlocking of the lock can be effected advantageously without relative movements occurring between the handle element and the base body.

Further details of the invention can be seen from the following description of a preferred embodiment with the associated drawings.

BRIEF DESCRIPTION OF THE DRAWINGS

In the figures, identical or functionally identical elements are provided with the same reference signs.

DETAILED DESCRIPTION OF THE DRAWINGS

Figure 1:
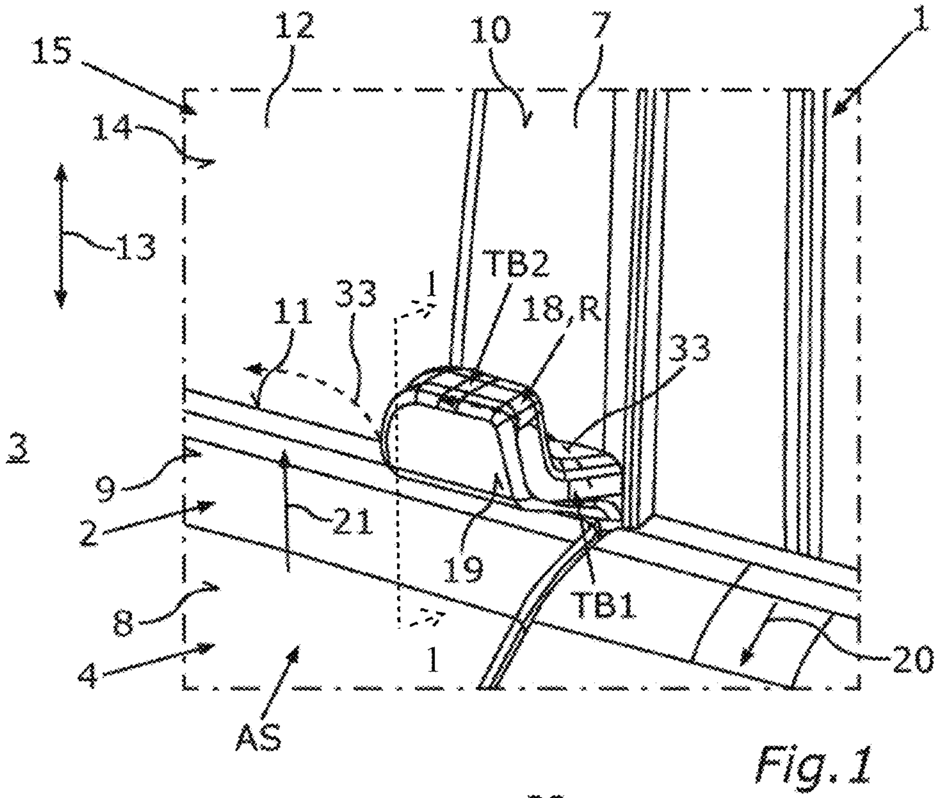
FIG. 1 is a schematic perspective view of a detail of a vehicle designed as a motor vehicle, in particular a passenger car, with a vehicle door.

FIG. 1 shows a schematic perspective view of a detail of a motor vehicle 1, which is designed here as a passenger car and is also referred to as a motor vehicle or vehicle, the interior of which, also referred to as the passenger cell or passenger compartment, is formed by a body of the motor vehicle 1, which is designed in particular as a self-supporting body. The motor vehicle 1 has at least one vehicle door 2, which is also referred to simply as a door. The vehicle door 2 is a wing element, which in the present case is designed as the vehicle door 2. A body opening of the superstructure is assigned to the vehicle door 2, wherein the body opening is designed as a side door opening of the superstructure in the exemplary embodiment shown in FIG. 1. The vehicle door 2 is held on the body so that it can be moved, in particular pivoted, relative to the body between a closed position and at least one open position. In the closed position, at least a partial region of the body opening is closed by the vehicle door 2. In the open position, the vehicle door 2 releases at least a partial region of the body opening so that, for example, a person who is initially in the surroundings 3 of the motor vehicle 1 and thus of the vehicle door 2 can enter the interior via the released partial region of the body opening. Furthermore, the person who is initially in the interior can, for example, exit the interior via the released portion of the body opening and thus reach the surroundings 3. The vehicle door has a base body 4, also known as the basic body or door body, which has a body shell 5, also known as the door shell, which can be seen in FIG. 2. The vehicle door 2 is movably, in particular pivotably, held on the body of the motor vehicle 1 via the body shell 5. The base body 4 has at least one outer cladding element 6, also known simply as a cladding element, which is formed separately from the body shell 5 and, in particular, is connected directly to the body shell 5. The outer cladding element 6 is also referred to as door paneling or outer door paneling. At least a first region of the body shell 5 is covered and thus clad by the outer cladding element 6, in particular in relation to the closed position of the vehicle door 2 towards the surroundings 3 and thus towards the outside, i.e., in a direction away from the interior. It can be seen from FIG. 1 that the vehicle door 2 has a paneling element 7, which is designed separately from the outer cladding element 6, for example. For example, the paneling element 7 is held at least indirectly, in particular directly, to the body shell 5. In particular, it is contemplated that at least a second region of the body shell 5, at least in relation to the closed position of the vehicle door 2, overlaps the surrounding region 3 and is therefore covered, i.e., clad, by the paneling element 7. The vehicle door 2 has an outer skin, also referred to as the overall outer skin 8, which can be perceived visually and haptically by the person in the surroundings 3 when the vehicle door 2 is in the closed position shown in FIG. 1. A first part of the overall outer skin 8 is formed by an outer skin of the outer cladding element 6, also referred to as the cladding outer skin 9. A second part of the overall outer skin 8 is formed by an outer skin of the paneling element 7, also known as the paneling element outer skin 10. For example, the paneling element 7 is formed from a plastic. For example, the paneling element 7 is designed as a panel, or the paneling element 7 is also referred to as a panel. In particular, it may be provided that, in the closed position of the vehicle door 2, a vehicle pillar of the body, which is designed in particular as a B-pillar, is outwardly in the transverse direction of the vehicle of the motor vehicle 1 by means of the paneling element 7 and is thus at least partially overlapped towards the surroundings 3 and thus covered, so that the paneling element 7 is referred to as a B-pillar panel, for example.

It can be seen particularly clearly from FIG. 1 that the vehicle door 2 has a beltline 11, also referred to as a parapet or window sill, which is also referred to as a belt edge or forms a belt edge of the motor vehicle 1. Furthermore, the vehicle door 2 comprises a side pane 12, also known simply as a pane, which can be displaced relative to the body shell 5 and relative to the outer cladding element 6, at least in relation to the closed position of the vehicle door 2 in the vertical direction of the motor vehicle 1. In particular, the base body 4 comprises, for example, the body shell 5, the outer cladding element 6 and the paneling element 7. Furthermore, the base body 4 can comprise, for example, the side window 12. It is contemplated, for example, that a third part of the overall outer skin 8 is formed by an outer skin of the windshield 12, also known as the windshield outer skin 14. The vertical direction of the vehicle is illustrated by a double arrow 13. In particular, the side window 12 can be moved, i.e., displaced, at least in relation to the closed position of the vehicle door 2 in the vertical direction of the motor vehicle 1 between a closed position shown in FIG. 1 and an open position not shown relative to the body shell 5 and relative to the outer cladding element 6 and also relative to the paneling element 7, in particular in translation. The open position is also referred to as the pane open position, and the closed position is also referred to as the pane closed position. A window region 15, also referred to as the window region, is at least partially delimited by the beltline 11, in particular in the installation position of the vehicle door 2 and downwards in the vertical direction of the vehicle 1. The installation position of the vehicle door 2 is shown in FIG. 1, wherein the vehicle door 2 assumes its installation position when the motor vehicle 1 with the vehicle door 2 is fully manufactured. In the exemplary embodiment shown in FIG. 1, the window region (window region 15) is a window opening, also referred to as a window opening, which can, for example, be defined by a window frame of the vehicle door 2, wherein the window frame can, for example, comprise the beltline 11. In particular, the window frame is, for example, a component of the base body 4. In the closed position, the side pane 12 is arranged at least partially in the window region 15, in particular in such a way that the window opening is at least partially, in particular at least predominantly and thus at least more than half or completely, closed by the side pane 12. In particular, it is provided that in the closed position (window closed position) of the side pane 12, the beltline 11 adjoins the side pane 12 downwards in the installation position of the vehicle door 2 in the vertical direction of the vehicle, in particular in relation to the closed position of the vehicle door 2.

Figure 2:
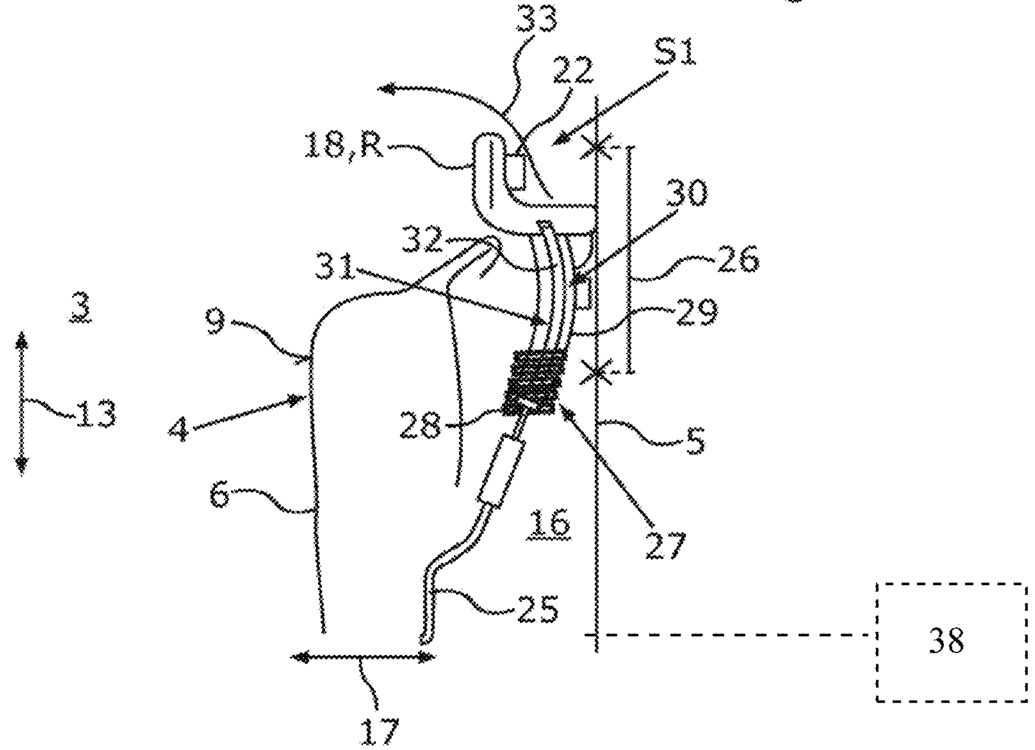
FIG. 2 is a schematic illustration of a detail of the vehicle door generally at section 1-1 of FIG. 1.

It can be seen from FIG. 2 that the vehicle door 2 has a shaft 16, also known as a pane shaft or window shaft, which, in the installed position of the vehicle door 2 and in the closed position of the vehicle door 2, is formed outwards in the transverse direction of the vehicle and thus towards the surroundings 3, in particular directly, by the body shell 5 and/or by the outer cladding element 6. In particular, in the installed position of the vehicle door 2 and in the closed position of the vehicle door 2, the shaft 16 is overlapped outwards in the transverse direction of the vehicle of the motor vehicle 1 and thus towards the surroundings 3 by the outer cladding element 6 and/or the body shell 5. The transverse direction of the vehicle is illustrated by a double arrow 17. The closed position and the installation position of the vehicle door 2 are also shown in FIG. 2. In the pane open position of the side pane 12, a partial region of the pane 12, also referred to as the pane partial region, is thus arranged in the shaft 16 and thus in particular outside the window region 15, in particular in such a way that the pane partial region is arranged below the beltline 11 and also below the window region 15 in the open position in the vehicle vertical direction of the motor vehicle 1, in particular in relation to the installation position of the vehicle door 2 and in relation to the closed position of the vehicle door 2. In the closed position (window closed position) of the side window 12, the window portion is arranged outside the shaft 16 and in the window portion 15, in particular in such a way that the window portion is arranged above the beltline 11 in the vertical direction of the vehicle, in particular at least in relation to the installation position and to the closed position of the vehicle door 2. In other words, in the window closed position, the beltline 11 adjoins the window portion in the vertical direction of the vehicle. For example, in the closed position (window closed position) of the side window 12, the window region 15 or the window opening is at least partially, in particular at least predominantly and therefore at least more than half or completely, closed by the window portion.

Furthermore, the vehicle door 2 has a handle element 18 on the outside of the door, which is also referred to as an external handle or external door handle. The handle element 18 is arranged above the beltline 11 in the installation position of the vehicle door 2 in relation to the closed position of the vehicle door 2 in the vehicle vertical direction of the motor vehicle 1, in particular at least partially and in particular predominantly or completely. The feature that the handle element 18 is arranged on the outside of the door or on the exterior, and is therefore an outside or exterior door handle element, is to be understood as meaning that the handle element 18 is arranged on an outer side AS of the vehicle door 2, the outer side AS of which, in the installed position of the vehicle door 2 and at least in the closed position of the vehicle door 2, faces away from the interior and towards the surroundings 3. The person present in the environment 3 can, for example, grasp the handle element 18 with their hand and therein, for example, at least partially grip it and subsequently exert a force, in particular a pulling force, on the handle element 18 in order to therein open the initially closed vehicle door 2, and thus move it from the closed position into the open position relative to the body.

The handle element 18 has an outer skin which can be perceived visually and haptically by the person in the surroundings 3 of the vehicle door 2, in particular of the motor vehicle 1 as a whole, also referred to as the handle element outer skin 19, by which, for example, a fourth part of the overall outer skin 8 is formed, which is therefore a fourth part of the overall outer skin 8.

In order to be able to operate, in particular actuate, the vehicle door 2 particularly easily, in particular ergonomically and comfortably, the handle element 18 has a first partial region TB1, also referred to as first body region or first body part, with a first direction of extension, which is also referred to as the first direction and is illustrated in FIG. 1 by an arrow 20. In the exemplary embodiment shown in FIG. 1, it is provided that the first partial region TB1 protrudes in the first direction (arrow 20) from the base body 4, in particular from the paneling element 7. In particular, the first direction extends in the installation position of the vehicle door 2 and in relation to the closed position of the vehicle door 2 in the transverse direction of the vehicle, in particular outwards. The handle element 18 also has a second partial region TB2, which is also referred to as the second body region or second body part. The second sub-region TB2 protrudes from the first sub-region TB1 in a second direction of extension illustrated in FIG. 1 by an arrow 21, which is also referred to as the second direction. The second sub-region TB2 extends along the second direction of extension. It can be seen from arrows 20 and 21 that the first direction and the second direction run perpendicularly or at an angle to each other, with the second direction in the present case pointing upwards in the vertical direction of the vehicle, in particular in the installation position of the vehicle door 2 and in relation to the closed position of the vehicle door 2. In particular, the second partial region TB2 adjoins an end of the partial region TB1 that faces away from the base body 4, in particular along the first direction, so that or whereby, in the exemplary embodiment shown in FIG. 1, the handle element 18 is L-shaped, in particular when viewed as a whole, and thus has an L-shape, in particular when viewed as a whole. The L-shape is formed by the partial regions TB1 and TB2. Thus, the handle element 18 is L-shaped in the exemplary embodiment shown in FIG. 1. The sub-regions TB1 and TB2 are respective legs of the L-shape, wherein the handle element 18 is connected via the sub-region TB1 via the base body 4, in particular to the body shell 5. The sub-region TB2 adjoins the sub-region TB1, in particular in the present case in such a way that the sub-region TB2 adjoins an end of the first sub-region TB1 that faces away from the base body 4, in particular along the first direction.

In order to be able to realize a particularly advantageous operation, a control element 22, shown particularly schematically in FIG. 2, is integrated into the handle element 18, in particular in the second partial region TB2, which is arranged in particular on an inner side S1 of the handle element 18, in particular of the second partial region TB2, facing the base body 4, in particular the paneling element 7.

It can be seen particularly clearly from FIG. 2 that the partial regions TB1 and TB2 are arranged above the beltline 11 in the installation position of the vehicle door 2 and in relation to the closed position of the vehicle door 2 in the vertical direction of the vehicle of the motor vehicle 1. The control element 22 is arranged above the door parapet 11 in the installation position of the vehicle door 2 in relation to the closed position of the vehicle door 2 in the vehicle vertical direction of the motor vehicle 1. By means of the control element 22, a lock 38, illustrated generally in FIG. 2, designed as a door lock in the present case can be electrically unlocked by operating, in particular actuating, the control element 22. The lock 38 is, for example, a component of the vehicle door 2 and can therefore be moved, in particular pivoted, with the vehicle door 2 relative to the body of the motor vehicle 1 between the open position and the closed position. By means of the lock 38, the vehicle door 2 can be held in the closed position relative to the body and thus secured in the closed position, so that the vehicle door 2 can be secured by means of the lock 38 against a movement relative to the body from the closed position into the open position. For this purpose, the lock 38 is locked in the closed position of the vehicle door 2, i.e., the lock 38 is moved into a locked state. By operating the control element 22, the lock 38 can be electrically unlocked, i.e., electrically moved from the locked state to an unlocked state of the lock, i.e., transferred. By moving the lock 38 from the locked state to the unlocked state of the lock, the lock 38 releases the vehicle door 2, which is initially in the closed position, for a movement from the closed position to the open position relative to the body of the motor vehicle 1.

Figure 3:
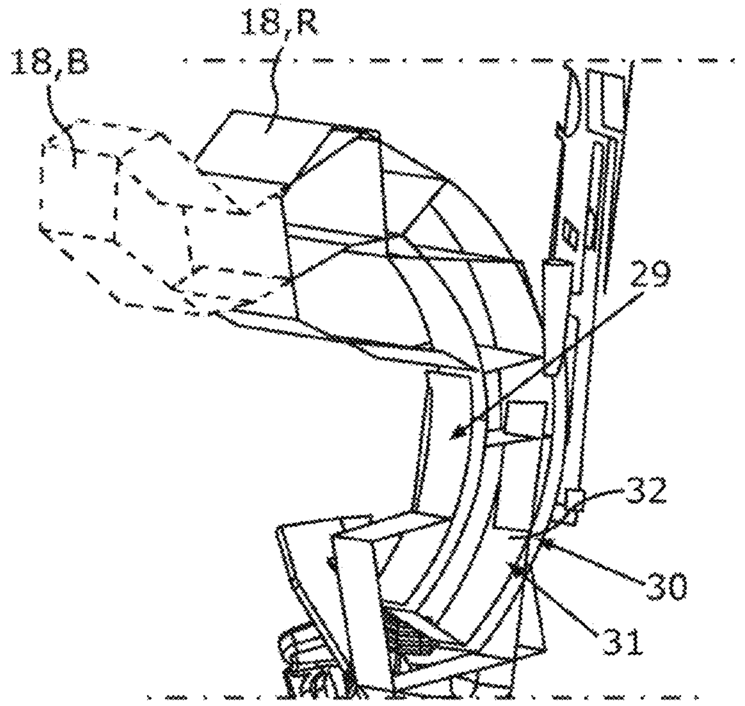
FIG. 3 is a schematic illustration of a detail of the vehicle door generally at section 1-1 of FIG. 1.

In order to be able to realize a particularly advantageous, in particular a particularly safe, operation of the vehicle door 2, it is also provided that the handle element 18 can be moved relative to the base body 4 and thus relative to the body shell 5, relative to the outer cladding element 6, relative to the paneling element 7 and also relative to the side window 12 from a rest position shown, for example, in FIGS. 1 to 3 and labeled R into an actuating position shown in dashed lines in FIG. 3 and labeled B, in particular between the rest position R and the actuating position B, is held movably on the base body 4, in particular on the body shell 5. By moving the handle element 18 from the rest position R to the actuating position B, the lock can be mechanically unlocked, in particular purely mechanically, and thus transferred from the locked state to the unlocked state.

The lock is unlocked, in particular purely mechanically, for example in the following way: A pulling means 25, also known as a cable element, is provided, which is designed as a wire or a wire cable, for example. In particular, the pulling means 25 is designed as a Bowden cable. The pulling means 25 is coupled on the one hand, in particular at one end, to the handle element 18, in particular mechanically. On the other hand, in particular at the other end, the pulling means 25 is mechanically coupled to the lock, for example. If, for example, the handle element 18 is moved manually from the rest position R into the actuation position B relative to the base body 4 by the person in the surroundings 3, a force in the form of a tensile force is transmitted from the handle element 18 to the pulling means 25 via the pulling means 25 to the lock and subsequently unlocks the lock, i.e., transfers it from the locked state to the unlocked state. As a result, the vehicle door 2 can be opened, i.e., moved from the closed position to the open position relative to the body. In simple terms, moving the handle element 18 from the rest position R to the actuation position B pulls on the pulling means 25, whereby the lock is unlocked mechanically, in particular purely mechanically, i.e., without using any electrical or other energy.

It can be seen from FIG. 2 that, for example, a holder 26, also known as a retaining element, is provided. The holder 26 is, for example, separate from the body shell 5 and is attached to the body shell 5, in particular by at least one or more screws. In other words, for example, the holder 26 is screwed to the body shell 5. The handle element 18 is held movably relative to the body shell 5 on the body shell 5 and thus on the base body 4 between the rest position R and the actuation position B by means of the holder 26, in particular such that the handle element 18 is held movably relative to the holder 26 on the holder 26 in the rest position R and the actuation position B.

The vehicle door 2 is designed such that when the control element 22 is operated and the lock is electrically unlocked as a result, the handle element 18 does not move from the rest position R to the actuation position B, i.e., the handle element 18 remains in its rest position R, in particular such that relative movements between the handle element 18 and the base body 4 do not occur. A retaining device 27 is provided for this purpose, which is also referred to as a force coupling or can be designed as a force coupling. The retaining device 27 secures the handle element 18 relative to the base body 4 in the rest position R up to a limit force and permits, in particular purely passively, the movement of the handle element 18 relative to the base body 4 from the rest position R into the actuating position B, in particular when and in particular only when an actuating force acting on the handle element 18 and provided for moving the handle element 18 from the rest position R into the actuating position B exceeds the limit force. Preferably, the limit force is greater than 90 N. For this purpose, for example, the retaining device 27 comprises at least one spring element 28, for example in the form of a mechanical spring, via which the handle element 18 can be supported or supported at least indirectly on the base body 4, in particular on the body shell 5, in particular such that the spring element 28 can be supported or supported at least indirectly, in particular directly, on the handle element 18 on the one hand and at least indirectly, in particular directly, on the base body 4, in particular on the body shell 5, on the other hand. The spring element 28 provides a spring force which secures the handle element 18 in the rest position R and, in particular purely, passively permits the movement of the handle element 18 relative to the base body 4 from the rest position R into the actuation position B, and preferably only when an actuation force acting on the handle element 18 exceeds the limit force. In other words, the handle element 18 can only be moved against the spring force from the rest position R into the actuating position B and, in particular, only from the rest position R into the actuating position B relative to the base body 4 if the actuating force exceeds the limit force.

Preferably, the rest position R is a stable position in which there is no relative movement between the handle element 18 and the base body 4. In particular, for example, the handle element 18 is held in the rest position R relative to the base body 4 by means of the retaining device 27, in particular in such a way that relative movements between the handle element 18 and the base body 4 are avoided. Quite preferably, the actuation position B is a particularly further stable position of the handle element 18, wherein the handle element 18 is preferably movable into the actuation position B and can be locked relative to the base body 4 in the actuation position B, in particular in such a way that relative movements between the handle element 18 and the base body 4 do not occur in the actuation position B. For this purpose, for example, a locking device is provided by means of which the handle element 18, in particular after it has been moved from the rest position R into the actuation position B, can be held or is held in the actuation position B relative to the base body 4.

It can be seen that the limit force is a force threshold that must be overcome in order to be able to move the handle element 18 relative to the base body 4, in particular into the actuation position B or in the direction of the actuation position B. Alternatively or additionally, the retaining device 27 can for example have two retaining elements, for example in the form of disks, namely a first retaining element, for example at least indirectly, in particular directly, attached to a body shell 5, and a second retaining element, for example at least indirectly provided on the handle element 18 and movable with the handle element 18. One of the retaining elements has, for example, at least one or more projections, in particular knobs. The other retaining element has, for example, at least one or more indentations corresponding to the projections, wherein, for example, the respective projection engages in the respective corresponding indentation in the rest position R. In order to be able to move the handle element 18 relative to the base body 4, in particular to be able to move it from the rest position R into the actuation position B, the respective projection must be moved out of the respective corresponding indentation, in particular pivoted out. To do this, the limit force (force threshold) must be overcome. Alternatively or additionally, it is contemplated that the handle element 18 is form-fittingly held in the rest position R, in particular latched in the rest position R, by means of the retaining device 27. In order to be able to move the handle element 18 relative to the base body 4, in particular from the rest position R to the actuation position B, the form-fit locking must be released, i.e., the handle element 18 must be unlocked. Only then can the handle element 18 be moved from the rest position R to the actuating position B. This ensures advantageous and unambiguous operation or actuation of the vehicle door 2. In particular, for example, the person in the surroundings 3 can exert an operating force on the control element 22 in order to cause the lock to unlock electrically. For this purpose, for example, the operating force of the person acts on the control element 22 in one operating direction. If the operating force is less than the limit force or if the operating force corresponds to the limit force, the handle element 18 remains in the rest position R. However, if the operating force exceeds the limit force, the handle element 18 is moved from the rest position R into the actuating position B relative to the base body 4. Thus, the lock can be mechanically unlocked, so to speak, in continuation of the operation of the control element 22 via the handle element 18, since the person can exert the operating force in the same direction on the control element 22 and via this on the handle element 18 in order to effect the electrical unlocking and the mechanical unlocking of the lock. To mechanically unlock the lock, however, the operating force must exceed the limit force.

In FIGS. 1 and 2, the movement or movability of the handle element 18 from the rest position R to the actuation position B is illustrated by arrows 33. In the exemplary embodiment illustrated in FIGS. 1 to 5, the vehicle door 2 has a first guide device 29 provided on the base body 4, in particular the body shell 5. The first guide device 29 is, for example, at least indirectly, in particular directly, fixed to the body shell 5 and is therefore, for example, immovable relative to the body shell 5. The first guide device 29 has a guide link 30. A second guide device 31 is provided on the handle element 18, which can be moved with the handle element 18 relative to the base body 4 from the rest position R into the actuating position B, in particular between the rest position R and the actuating position B. The second guide device 31 comprises at least one guide element 32, which engages in the guide link 30. As a result, the guide devices 29 and 31 interact form-fittingly. In other words, the guide device 31 engages in the guide device 29, whereby the guide devices 29 and 31 interact form-fittingly. As a result of the guide devices 29 and 31 engaging with one another, and thus cooperating, the guide devices 29 and 31 define or form a path of movement, illustrated in particular by the arrow 33 shown in FIG. 2, along which the handle element 18 can be moved in a guided manner relative to the base body 4 from the rest position R into the actuation position B, in particular between the rest position R and the actuation position B. For example, the guide device 29 is held at least indirectly on the body shell 5, for example via the holder 26. It is also contemplated that the guide device 29 is held directly on the body shell 5. It is also contemplated that the guide device 29 is attached, in particular fixed, directly to the holder 26 and to the body shell 5 via the holder 26. FIG. 2 shows particularly clearly that the path of movement is curved, in this case in such a way that in the installation position of the vehicle door 2 and in relation to the closed position of the vehicle door 2, the curved path of movement is curved towards the interior of the motor vehicle 1 and thus curved away from the surroundings 3. Thus, on its path from the rest position R to the actuating position B, the handle element 18 moves upwards in the vertical direction of the vehicle and outwards in the transverse direction of the vehicle, i.e., away from the interior, in particular with respect to the installation position of the vehicle door 2 and with respect to the closed position of the vehicle door 2. Expressed again in other words, the handle element 18 in the actuating position B is thus arranged further upwards in the vertical direction of the vehicle and further outwards in the transverse direction of the vehicle, and thus further away from the interior, in particular in relation to the closed position and the installed position of the vehicle door 2, compared to the inoperative position R. This is realized in the present case in such a way that the guide link 30 is curved towards the interior in the installed position and in the closed position of the vehicle door 2.

Figure 4:
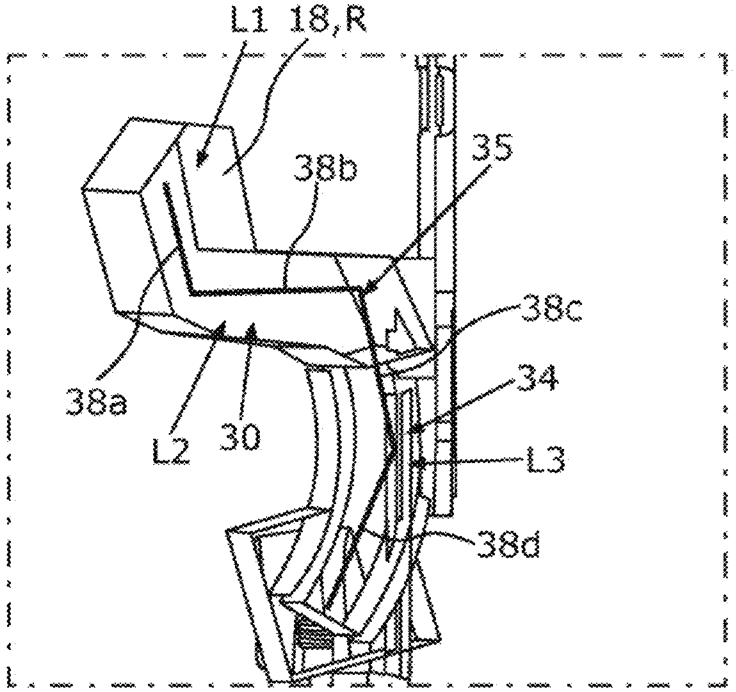
FIG. 4 is a further schematic illustration of a detail of the vehicle door generally at section 1-1 of FIG. 1.
Figure 5:
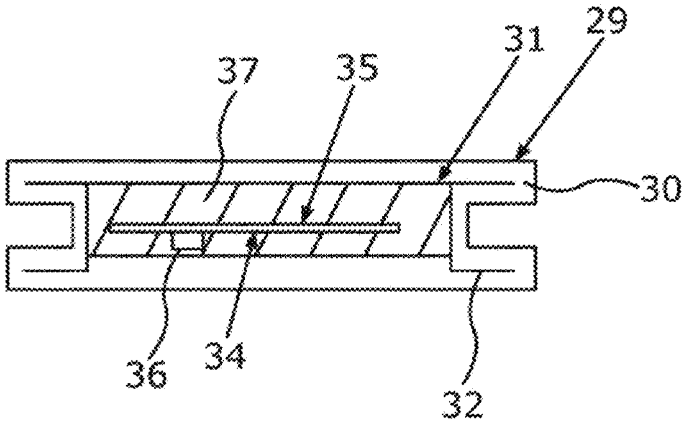
FIG. 5 is a schematic illustration of a detail of the vehicle door.

FIGS. 3 and 4 show that the vehicle door 2 has an electronics unit 34, also known simply as an electronics unit. The electronics unit 34 is also shown in FIG. 5. It can be seen from FIG. 5 that the electronics unit 34 has a circuit board 35, also known as a printed circuit board, and at least one electronic component 36, which is arranged on the circuit board 35 and is thus supported by the circuit board 35.

In order to be able to realize a particularly compact design, the electronics unit 34 is arranged at least partially in the guide link 30, as can be seen particularly well from FIGS. 4 and 5, in such a way that at least the circuit board 35 is arranged at least partially in the guide link 30. It is also contemplated that the component 36 can be arranged at least partially in the guide link 30. In this case, the electronics unit 34 is held at least indirectly on the guide element 32 and thus on the guide device 31, whereby the electronics unit 34 can be moved with the guide element 32, thus with the guide device 31 and with the handle element 18 along the path of movement and in particular along the guide link 30 relative to the base body 4 and in particular relative to the guide device 29, in particular from the rest position R into the actuation position B. In particular, the electronics unit 34 is arranged at least partially in the guide link 30, in particular at least in the rest position R and/or the actuating position B, in such a way that the circuit board 35 is arranged at least partially in the guide link 30, at least in the rest position R and/or in the actuating position B. It is contemplated that the electronic component 36 is arranged in the guide link 30 in the rest position R and/or in the actuation position B, or the component 36 is arranged outside the guide link 30 in the rest position R and/or in the actuation position B. Thus, at least the circuit board 35 is arranged at least partially in the guide link 30 in the actuating position B and/or in the rest position R.

In the exemplary embodiment shown in FIG. 5, the electronics unit 34 is embedded on the outer circumference at least partially, in particular at least predominantly and thus at least more than half, in a potting compound 37 formed, for example, from a plastic, which forms, for example, a solid body. The electronics unit 34 is connected to the guide element 32 and thus to the guide device 31 via the potting compound 37, i.e., it is held on the guide element 32 and thus on the guide device 31. For this purpose, the potting compound 37 is directly connected to the guide element 32 (guide device 31).

It can be seen from FIG. 4 that the circuit board 35 has several circuit board regions 38*a-d* that run at an angle to each other and are formed in one piece with each other, for example, which are arranged in respective longitudinal regions L1, L2 and L3 of the guide link 30 that run at an angle or perpendicular to each other. In this way, the shape of the circuit board 35 is adapted to the shape of the guide link 30. It is contemplated that at least two of the angularly extending circuit board regions 38*a-d* are arranged in a common, arcuate longitudinal region, such as the longitudinal region L3 of the guide link 30, whereby the shape of the circuit board 35 is adapted to the shape of the guide link 30.

The feature that the electronics unit 34 is arranged at least partially in the guide link 30 is to be understood in particular as meaning that the electronics unit 34 is arranged in the guide link 30 at least in the rest position R of the handle element 18 and/or at least in the actuation position B of the handle element 18. In this way, a particularly compact structure can be realized, so that the electronics unit 34 can be arranged particularly advantageously in the shaft 16. In particular, this means that the electronics unit 34 is arranged in the shaft 16 at least in the rest position R. Usually, the shaft 16 only has a small installation space available, which can now be used effectively and efficiently to locate the electronics unit 34.

It is contemplated that the component 36 is arranged in the second partial region TB2. Thus, for example, the component 36 is arranged in the handle element 18. The component 36 can be the control element 22 or a component of the control element 22. In particular, for example, the component 36 is designed as a sensor, also referred to as a detection sensor, by means of which, for example, an operation of the control element 22 caused by the person present in the environment 3 can be detected.

LIST OF REFERENCE SIGNS

1 motor vehicle
2 vehicle door
3 surroundings
4 base body
5 body shell
6 outer cladding element
7 paneling element
8 overall outer skin
9 cladding outer skin
10 paneling element outer skin
11 beltline
12 side window
13 double arrow
14 window outer skin
15 window region
16 shaft
17 double arrow
18 handle element
19 handle outer skin
20 arrow
21 arrow
22 control element
23 double arrow
24 arrow
25 pulling means
26 holder
27 retaining device
28 spring element
29 first guide device
30 guide link
31 second guide device
32 guide element
33 arrow
34 electronics unit
35 circuit board
36 electronic component
37 potting compound
38 lock
AS outer side
B actuating position
R rest position
S1 inner side
SA pivot axis
TB1 sub-region
TB2 sub-region

The invention claimed is:

1. A vehicle door configured to be movably arranged on a body of a motor vehicle between a closed position and at least one open position, the vehicle door comprising:

a base body of the vehicle door;

a handle element on an outside of the vehicle door;

a lock by which the vehicle door is securable in the closed position, wherein the handle element is held on the base body so as to be movable relative thereto from a rest position into at least one actuating position, wherein moving the handle element from the rest position into the at least one actuating position makes it possible to unlock the lock;

a first guide provided on the base body;

a second guide provided on the handle element and interacting with the first guide, whereby the handle element is movable along a path of movement relative to the base body, which the path of movement is predetermined by the interacting of the first and second guides, from the rest position into the at least one actuating position;

one of the first and second guides has a guide link;

the other one of the first and second guides engages into the guide link, wherein the guides interact; and at least one circuit board, on which at least one electronic component is arranged, is arranged at least partially in the guide link such that the circuit board moves along the guide link with the handle element from the rest position into the at least one actuating position, wherein the circuit board has a plurality of circuit board regions which extend at an angle to one another and are formed integrally with one another, and wherein the plurality of circuit board regions:

(i) are arranged in respective longitudinal regions of the guide link extending obliquely or perpendicularly to one another, wherein a shape of the circuit board is adapted to a shape of the guide link; and/or (ii) are arranged in at least one arcuate longitudinal region of the guide link, wherein a shape of the circuit board is adapted to a shape of the guide link.

2. The vehicle door according to claim 1, wherein the circuit board and the electronic component are held at least indirectly on the other one of the first and second guides and can thus be moved along the guide link with the other one of the first and second guides.

3. The vehicle door according to claim 2, wherein the circuit board and the electronic component are embedded in a potting compound, by which the circuit board and the electronic component are held on the other one of the first and second guides.

4. The vehicle door according to claim 1, wherein the circuit board has a plurality of circuit board parts which extend at an angle to one another and are formed separately from one another and are electrically connected to one another.

5. The vehicle door according to claim 4, wherein the circuit board parts:

(i) are arranged in respective longitudinal regions of the guide link which extend obliquely or perpendicularly to one another, wherein a shape of the circuit board is adapted to a shape of the guide link; and/or (ii) are arranged in at least one arcuate longitudinal region of the guide link, wherein a shape of the circuit board is adapted to a shape of the guide link.

6. The vehicle door according to claim 1, wherein the at least one electronic component comprises a sensor, an antenna, a microchip, power electronics, and/or an LED.

7. The vehicle door according to claim 1, further comprising:

a control element integrated into the handle element, wherein the control element is capable of unlocking the lock electrically.

8. The vehicle door according to claim 7, wherein the at least one electronic component is designed to detect an operation of the control element effected by a person and causing the electrical unlocking of the lock.

9. A motor vehicle comprising at least one vehicle door according to claim 1.

* * * * *